Dec. 29, 1959 — R. RABE — 2,918,824
CENTRIFUGAL CLUTCH STRUCTURE
Filed Sept. 6, 1955
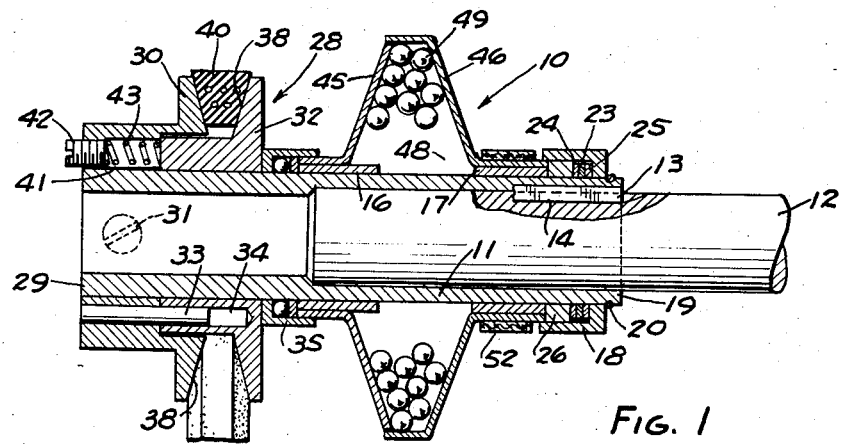
FIG. 1
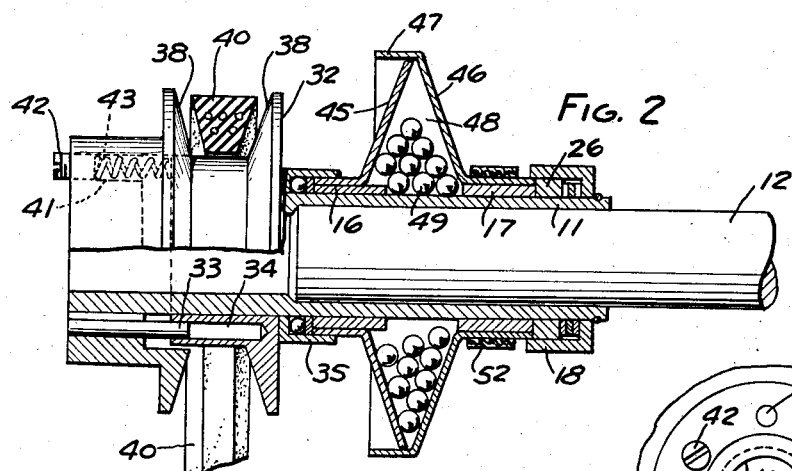
FIG. 2
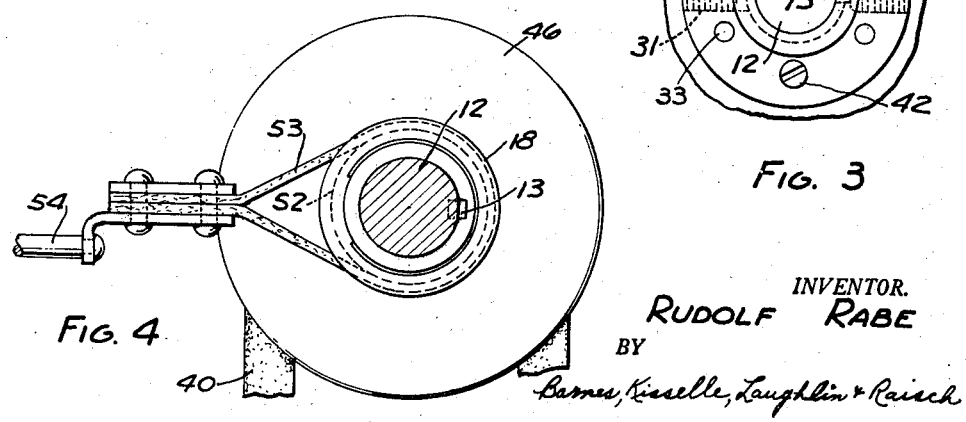
FIG. 3
FIG. 4
INVENTOR.
RUDOLF RABE
BY
Barnes, Kisselle, Laughlin & Raisch
ATTORNEYS.

2,918,824

CENTRIFUGAL CLUTCH STRUCTURE

Rudolf Rabe, Taylor Center, Mich.

Application September 6, 1955, Serial No. 532,456

3 Claims. (Cl. 74—230.17)

This invention relates generally to a centrifugal clutch and more particularly to a clutch in which there is a lag between acceleration of a drive shaft to running speed and actuation of the centrifugal operating mechanism.

The invention is applicable generally to all types of motorized apparatus wherein such a clutch is desirable. An exemplary application of the invention is in relatively small powered equipment such as lawn mowers, garden tillers and the like. Heretofore such devices have utilized hand operated clutches, necessitating relatively complicated mechanical linkage or have utilized relatively expensive fluid clutches.

An object of this invention is to provide a simple, inexpensive, centrifugal clutch structure which will remain disengaged at low engine speeds but which will engage when the engine is accelerated to running speed. Another object is to provide means for disengaging the clutch regardless of engine speed.

The invention generally contemplates the use of a shaft having a pair of sleeves which are relatively axially shiftable responsively to operation of a centrifugal mechanism for operating a clutch. Both sleeves are rotatable about the drive shaft so that the centrifugal mechanism remains collapsed and the clutch disengaged when the shaft rotates at idling speed. Frictional drag is provided between the shaft and sleeves so that the sleeves rotate to actuate the centrifugal mechanism when the shaft is accelerated to running speed. A brake is provided on one sleeve to disengage the clutch regardless of the speed of rotation of the shaft. One form of the invention is shown in the accompanying drawings:

Fig. 1 is a generally sectional view of a clutch according to this invention, showing the clutch in an engaged position.

Fig. 2 is a generally sectional view with parts shown in elevation and illustrating the clutch in released position.

Fig. 3 is a fragmentary, generally elevational view of one end of the device.

Fig. 4 is a generally elevational view of the other end of the device.

The clutch 10 shown in the drawings has a shaft 11 which is illustrated as being hollow so that it can be fixed non-rotatably about the drive shaft 12 of an engine (not shown) by such means as a key 13 disposed in an axial keyway 14. Two sleeves 16 and 17 are rotatably mounted around hollow shaft 11. These sleeves are rotatable and axially shiftable independently of each other. A retainer ring 18 is secured adjacent one end 19 of shaft 11 by such means as snap ring 20. Retainer ring 18 provides axial support for a frictional drag structure which preferably comprises a bronze ring 23 sandwiched between rings 24 and 25, which may be formed of steel. A bushing 26 may be provided between sleeve 17 and the drag plates.

A pulley 28 is mounted at the other end 29 of shaft 11. The pulley comprises a pulley member 30 fixed around shaft 11 by such means as screws 31 and a pulley member 32 which is axially shiftable on the shaft. Pulley member 32 is driven by axially extending pins 33 on member 30 which project slidably into openings 34 in pulley member 32. Pulley member 32 bears axially against sleeve 16 and an anti-friction bearing, such as ball bearing 35, is preferably disposed therebetween. In the form of the invention shown the pulley members have inner surfaces 38 adapted for operably engaging a V-type belt 40.

Pulley member 30 has a number of axial recesses 41, each having an end closed by a screw 42 and forming a seat for a compressed spring 43 which reacts against pulley element 32. Sleeve 16 has an annular generally radially outwardly extending plate 45 fixed thereon and sleeve 17 has a similar plate 46 fixed thereon. Plates 45 and 46 are inclined toward each other and one of the plates, such as plate 46, has an axially turned portion 47 which slidably contacts the outer edge of plate 45. The plates form an outwardly taper enclosure 48 which contains a fluent material illustrated as comprising a mass of shot 49. Springs 43, acting through pulley member 32 and bearing 35, urge sleeve 16 toward sleeve 17 and tend to collapse chamber 48 in an axial direction. The springs also urge sleeve 17 against the frictional drag plates as illustrated.

A brake band 52 is provided around a portion of member 46. Brake band 52 is adapted to be engaged by a brake shoe which may have the form of a looped metal strap 53 secured to a suitable control such as a pull rod 54 (Fig. 4).

In use, it may be assumed that the clutch assembly 10 is mounted on an engine driven drive shaft 12 in the manner described. When the drive shaft is stationary, pulley member 32, sleeve 16 and plate 45 are secured by springs 43 in the positions shown in Fig. 2 with chamber 48 in collapsed condition and with the pulley members spaced apart and operably disengaged from belt 40. Sleeve 17 is operably engaged by the friction drag structure at 24. The stress in springs 43 is adjusted by turning screws 42 so that when drive shaft 12 and clutch shaft 11 are rotated at idling speeds, the frictional drag rotates sleeves 16 and 17 and housing 48 at a speed insufficient for shifting shot 49 centrifugally outwardly. Consequently, at idling speeds, pulley members 30 and 32 remain axially disengaged from belt 40.

When shaft 12 is accelerated to running speed, the frictional drag between clutch shaft 11 and sleeves 16 and 17 is increased. Housing members 45 and 46 are rotated rapidly so that the mass of shot 49 is thrown centrifugally outwardly. The shot act upon taper plates 45 and 46 and extend chamber 48 axially, forcing sleeve 16 and pulley member 32 to the left as the drawings are viewed, thereby closing pulley surfaces 38 into operative engagement with belt 40 (Fig. 1). Initially, plate 46 may rotate more rapidly than plate 45 because of the greater frictional drag on sleeve 17 through friction plates 23–25. This differential is largely eliminated when shot 49 shift outwardly.

The speed of rotation of shaft 12 may be reduced from time to time when the engine driving it is idled down, for example, when a lawn mower or similar device driven driven by the engine is momentarily stopped. When this occurs the frictional drag between clutch shaft 11 and sleeves 16 and 17 diminishes, removing the driving connection between the shaft and sleeves; the force of shot 49 on plates 45 and 46 is relieved, chamber 48 collapses axially under the force of springs 43, and pulley member 32 moves away from pulley 30 to disengage surfaces 38 from belt 40 (Fig. 2). The clutch reengages in the manner described when shaft 12 is again accelerated. The stress of springs 43 may be adjusted as required from time to time for regulating the drag of plates 23–25 by turning screws 42 inwardly or outwardly.

Pulley members 30 and 32 may be disengaged from belt 40 regardless of the speed of rotation of shafts 11 and 12 by pulling on pull rod 54 to frictionally engage shoe 53 against brake band 52. Because of the rotational connection of sleeves 16 and 17 with shaft 11, a relatively small braking force is sufficient to reduce rotation of plate 46 to the point where the centrifugal force of shot 49 against plates 45 and 46 collapses and the pulley elements will open, releasing belt 40 as described. The clutch may be thus released by the relatively easy direct manual pull on rod 54. To reengage the clutch, rod 54 is merely released to relieve the braking pressure on band 52 so that housing 48 may resume rotation.

In some applications no manual clutch releasing feature will be required and the brake structure will be omitted. It is contemplated that in some applications the frictional drag adjusting screws 42 will be omitted from the structure and that in some applications sufficient frictional drag may be provided directly between sleeves 16 and 17 and shaft 11 so that frictional drag plates 23-25 will not be necessary.

It is contemplated that this invention will have broad application in connection with electric motors where it is desirable for the motor to approach its running speed before picking up its load.

I claim:

1. Centrifugal clutch structure comprising, shaft means adapted to be connected to a motor means, a pulley mounted concentrically on said shaft means, said pulley being adapted to operably engage a belt to be driven, said pulley having one portion axially fixed on said shaft means and having another portion axially shiftable thereon to a belt clutching position and a released position, a pair of sleeves mounted generally freely rotatably around said shaft means, said sleeves being independently rotatable and being axially shiftable relatively to each other, outwardly projecting cooperable means on said sleeves, frictional drag means interconnecting said sleeves and shaft means for rotating said sleeves when said shaft means attains generally a predetermined speed of rotation, said drag means including friction plate means fixed axially on said shaft means and abutting an end of one sleeve, spring means seating on said fixed pulley portion and reacting against said shiftable pulley portion, said shiftable pulley portion and the other of said sleeves being in axial bearing relation so that said spring means urges said sleeve end against said friction plate means, centrifugally movable means operable on said cooperable means responsively to rotation of said sleeves at generally a predetermined speed to shift said other sleeve away from said one sleeve against the action of said spring means, whereby to shift said other pulley portion to said belt clutching position, said spring means being operable to return said other sleeve toward said one sleeve at a lower speed of rotation thereof, whereby to shift said other pulley portion to said released position.

2. Centrifugal clutch structure comprising, means forming a shaft adapted to be connected to a motor means, clutch means shiftable to engaged and released positions, a plurality of members each member having a central portion mounted concentrically around said shaft and engaging said shaft, each member having another portion projecting radially outwardly of said central portion, said central portions of said members being disposed at axially spaced locations on said shaft and each of said central portions being generally freely rotatable with respect to said shaft at low relative speeds of said shaft and central portions, said central portions also being shiftable relative to each other on said shaft, a frictional drag connection between said shaft and one of said members, said connection including friction plate means fixed axially on said shaft and abutting said one member, said connection also including spring means supported by said shaft and urging the other of said members toward said one member, said connection including means interengageable to transmit the force of said spring means through said other member to said one member and thereby urge said one member into frictional engagement with said friction plate means, said drag connection being operative to rotate said members when said shaft is accelerated to generally a predetermined speed of rotation, centrifugally movable means associated with said other portions of said members and operable responsively to rotation of said members at a generally predetermined speed to shift the relative axial position of said members against the action of said spring means for operating said clutch means, said spring means being operative to restore generally the initial relative position of said members at a lower speed of rotation of said members.

3. The centrifugal clutch structure defined in claim 2 wherein said spring means reacts axially against an element, said element being axially movable for regulating the stress in said spring whereby to adjust the frictional drag in said connection.

References Cited in the file of this patent

UNITED STATES PATENTS

| 1,618,644 | Dickson | Feb. 22, 1927 |
| 2,144,443 | Thomas | Jan. 17, 1939 |
| 2,709,372 | Melone | May 31, 1955 |

FOREIGN PATENTS

| 52,375 | France | Nov. 29, 1943 |
| | (Addition to Patent 883,174) | |